(12) United States Patent
Kawamura et al.

(10) Patent No.: US 12,280,635 B2
(45) Date of Patent: Apr. 22, 2025

(54) ELECTRIC COMPRESSOR

(71) Applicant: KABUSHIKI KAISHA TOYOTA JIDOSHOKKI, Kariya (JP)

(72) Inventors: Shinichi Kawamura, Kariya (JP); Keiji Yashiro, Kariya (JP); Yuzuki Ando, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 236 days.

(21) Appl. No.: 18/082,879

(22) Filed: Dec. 16, 2022

(65) Prior Publication Data

US 2023/0202261 A1 Jun. 29, 2023

(30) Foreign Application Priority Data

Dec. 23, 2021 (JP) ................................ 2021-209099

(51) Int. Cl.
 *B60H 1/32* (2006.01)
 *F04D 25/06* (2006.01)
 *F04D 27/02* (2006.01)

(52) U.S. Cl.
 CPC ......... *B60H 1/3222* (2013.01); *B60H 1/3208* (2013.01); *F04D 25/0673* (2013.01); *F04D 27/0292* (2013.01)

(58) Field of Classification Search
 CPC .......... H02M 1/08; H02M 1/32; H02H 3/243; H02P 25/16; F04D 25/06; F04D 25/0673; F04D 27/0292; F04D 35/04; B60H 1/3222; B60H 1/3208

USPC .......................................................... 417/45
See application file for complete search history.

(56) References Cited

U.S. PATENT DOCUMENTS

| | | | | |
|---|---|---|---|---|
| 8,182,245 B2* | 5/2012 | Maeda | ................ | H02M 7/5387 417/45 |
| 8,476,862 B2* | 7/2013 | Matsumoto | ........... | H01M 10/44 417/18 |
| 2010/0315024 A1* | 12/2010 | Najima | ............. | H02M 7/53871 318/139 |
| 2013/0291578 A1* | 11/2013 | Hatakeyama | ........... | H02P 29/62 417/45 |
| 2014/0015461 A1* | 1/2014 | Ohba | ........................ | H02P 6/20 318/472 |

(Continued)

FOREIGN PATENT DOCUMENTS

| | | |
|---|---|---|
| JP | 2010-057333 A | 3/2010 |
| JP | 2018-007403 A | 1/2018 |

(Continued)

*Primary Examiner* — Alexander B Comley (74) *Attorney, Agent, or Firm* — Sughrue Mion, PLLC (57) ABSTRACT

An electric compressor includes an electric motor, a filter circuit, a capacitor, an inverter circuit, a drive circuit, a power supply circuit, a switch that connects or disconnects a power supply path that passes power from the power supply circuit to the drive circuit, and a control circuit that controls an operation of the switch. The control circuit connects the power supply path in response to the voltage between the capacitor and the inverter circuit being higher than that between the power supply circuit and the drive circuit, and the control circuit disconnects the power supply path in response to the voltage between the capacitor and the inverter circuit being lower than the voltage between the power supply circuit and the drive circuit.

3 Claims, 5 Drawing Sheets

(56) References Cited

U.S. PATENT DOCUMENTS

| | | | |
|---|---|---|---|
| 2015/0311845 A1* | 10/2015 | Nagata | H02P 21/26 |
| | | | 318/400.02 |
| 2016/0036359 A1* | 2/2016 | Nagata | H02P 29/032 |
| | | | 318/400.1 |
| 2017/0187320 A1* | 6/2017 | Kanie | H02M 7/5395 |
| 2017/0284409 A1* | 10/2017 | Kawashima | F04B 49/20 |
| 2018/0102723 A1* | 4/2018 | Kawashima | H02P 21/22 |
| 2018/0241340 A1* | 8/2018 | Hoshino | G01R 31/343 |
| 2018/0254731 A1* | 9/2018 | Ishita | H02M 1/36 |
| 2020/0313504 A1* | 10/2020 | Okochi | F04C 29/0085 |
| 2020/0382021 A1* | 12/2020 | Yamane | H02P 27/06 |

FOREIGN PATENT DOCUMENTS

| | | | | |
|---|---|---|---|---|
| JP | 2020-159320 A | 10/2020 | | |
| WO | WO-2016092985 A1 * | 6/2016 | | H02M 7/48 |

* cited by examiner

ELECTRIC COMPRESSOR

This nonprovisional application is based on Japanese Patent Application No. 2021-209099 filed on Dec. 23, 2021 with the Japan Patent Office, the entire contents of which are hereby incorporated by reference.

BACKGROUND

The present disclosure relates to an electric compressor, and more specifically to an electric compressor operable using direct-current (DC) power received from a battery of a vehicle.

DESCRIPTION OF THE BACKGROUND ART

Conventionally, vehicles such as hybrid electric vehicles, battery electric vehicles, or a fuel cell electric vehicles have mounted therein an electric compressor used for a vehicular air conditioner or the like. For example, Japanese Patent Laying-Open No. 2020-159320 discloses an electric compressor which receives DC power from a high-voltage battery mounted in a vehicular system, converts the received DC power into alternating-current (AC) power, and supplies the AC power to an electric motor. The electric compressor disclosed in Japanese Patent Laying-Open No. 2020-159320 comprises an inverter circuit that receives DC power from the high-voltage battery and converts the received DC power into AC power, as controlled by a control computer, and a low-voltage power supply that supplies the control computer with power smaller than the power received from the high-voltage battery.

SUMMARY

By driving the inverter circuit, as controlled by the control computer, the electric compressor disclosed in Japanese Patent Laying-Open No. 2020-159320 can convert the DC power that is received from the high-voltage battery of the vehicular system into AC power and supply the AC power to the electric motor. However, for example, when the vehicular system stops, and a voltage on the side of the high-voltage battery becomes lower than a voltage applied from the low-voltage power supply to the control computer, the power from the low-voltage power supply may build up an electric charge in a capacitor inside/outside the electric compressor. In such a case, the electric charge built up in the capacitor may have an effect to damage devices in the vehicular system or reduce their lifetimes. Such a problem exists not only in a vehicular air conditioner but also generally in a system in which an electric compressor is operated by power received from an external battery.

The present disclosure has been made to address the above issue, and contemplates a technology for preventing power for controlling an electric compressor from having an effect to damage devices in a system having the electric compressor mounted therein or reduce their lifetimes.

An electric compressor according to an aspect of the present disclosure comprises an electric motor, a filter circuit, a capacitor, an inverter circuit, a drive circuit, a power supply circuit, a switch, and a control circuit. The filter circuit reduces noise in power supplied from an external battery. The capacitor constitutes a filter circuit. The inverter circuit receives power supplied from the battery through the filter circuit, converts the received power from DC power to AC power, and supplies the AC power to the electric motor. The drive circuit is connected to a first power supply path from the inverter circuit to the electric motor to control an operation of the inverter circuit. The power supply circuit receives power supplied from the battery, transforms the received power, and supplies the transformed power to the drive circuit. The switch connects or disconnects a second power supply path that supplies power from the power supply circuit to the drive circuit. The control circuit controls an operation of the switch. The control circuit connects the second power supply path in response to a voltage between the capacitor and the inverter circuit being higher than a voltage between the power supply circuit and the drive circuit, and the control circuit disconnects the second power supply path in response to the voltage between the capacitor and the inverter circuit being lower than the voltage between the power supply circuit and the drive circuit.

According to the above configuration, the electric compressor can connect or disconnect by a switch a power supply path that passes power from the power supply circuit to the drive circuit. The electric compressor can thus prevent power supplied from the power supply circuit to the drive circuit from building up an electric charge in a capacitor in the electric compressor, and can hence prevent power for controlling the electric compressor from having an effect to damage devices in a system having the electric compressor mounted therein or reduce their lifetimes.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment of the present disclosure will be described in detail with reference to the accompanying drawings. In the figures, identical or corresponding components are identically denoted and will not be described repeatedly.

[Configuration of Electrical Compressor]

Figure 1:
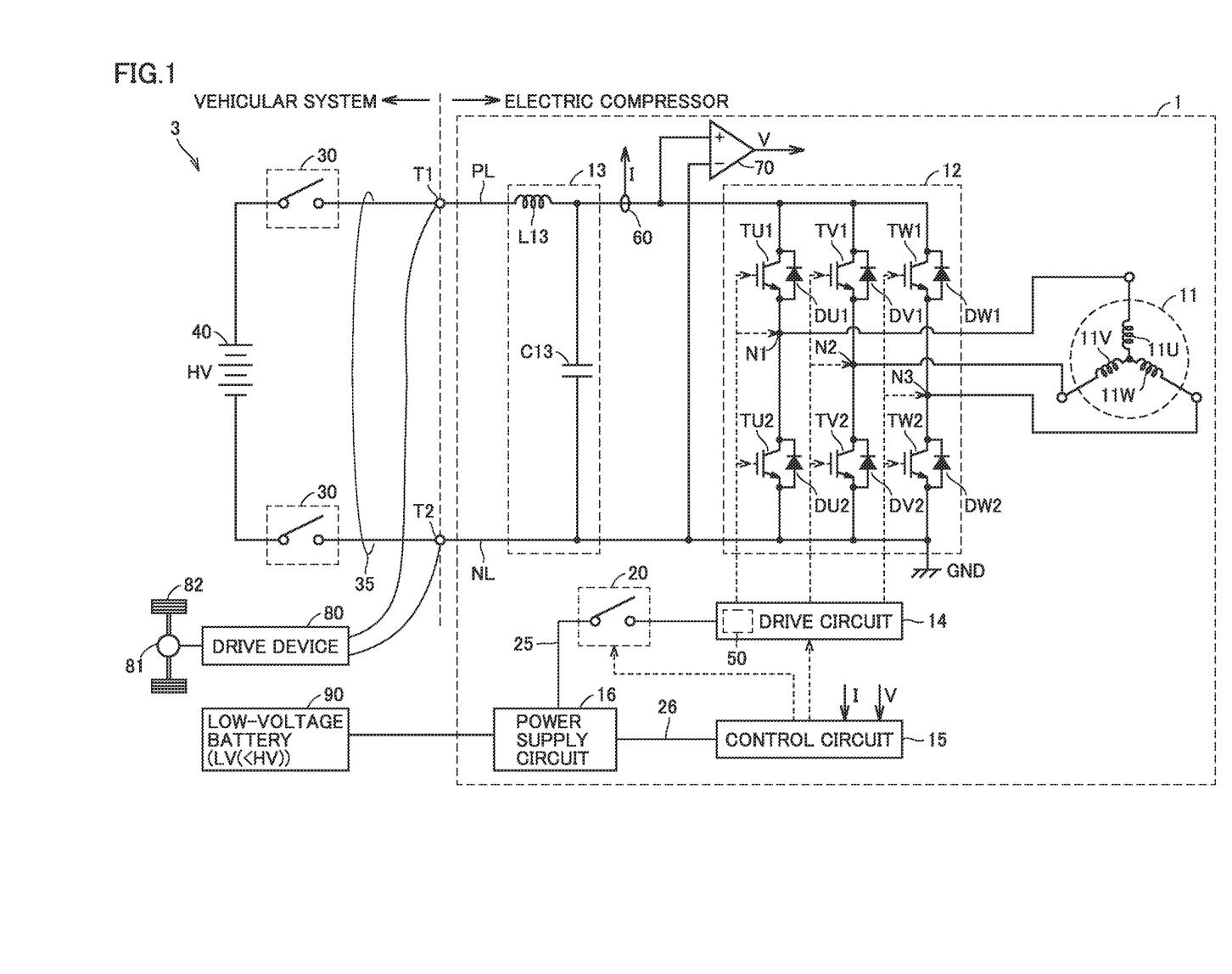
FIG. 1 is a circuit diagram showing a configuration of an electric compressor according to an embodiment.

A configuration of an electric compressor 1 according to an embodiment will be described with reference to FIG. 1. FIG. 1 is a circuit diagram showing a configuration of the electric compressor 1 according to an embodiment.

The electric compressor 1 is an electric compressor used for a vehicular air conditioner or the like. As shown in FIG. 1, the electric compressor 1 is connectable to a vehicular system 3 by a cable 35 connected to a connection point T1 and a connection point T2. The connection points T1 and T2 are attached to the housing of the electric compressor 1 as connectors (not shown). The vehicular system 3 comprises a switch 30, a battery 40, a drive device 80, a gear 81, and a drive wheel 82. The battery 40 corresponds to an "external battery" in the present disclosure.

The drive device 80 drives the drive wheel 82 via the gear 81 by using power supplied from the battery 40. The electric compressor 1 is an auxiliary device that converts DC power that is received from a battery 40 and used for the drive device 80 into AC power and supplies the AC power to an electric motor 11, which will be described later.

The battery 40 is a rechargeable/dischargeable secondary battery such as a lithium ion secondary battery, a nickel metal hydride battery, or a lead storage battery. For vehicles such as hybrid electric vehicles, battery electric vehicles, or a fuel cell electric vehicles, a secondary battery of 200 V to 400 V can be applied as the battery 40. In FIG. 1, the voltage of the power supplied from the battery 40 is denoted by "HV." The battery 40 has a positive terminal connected to the connection point T1 via the switch 30. The battery 40 has a negative terminal connected to the connection point T2.

The switch 30 electrically connects or disconnects a path between the battery 40 and the electric compressor 1. A specific configuration of the switch 30 will be described later with reference to FIG. 2.

The electric compressor 1 comprises a positive electrode line PL, a negative electrode line NL, electric motor 11, an inverter circuit 12, a filter circuit 13, a drive circuit 14, a control circuit 15, and a power supply circuit 16.

The positive electrode line PL is connected to the positive electrode terminal of the battery 40 via the connection point T1. The negative electrode line NL is connected to the negative electrode terminal of the battery 40 via the connection point T2. The negative electrode line NL is also connected to a ground terminal GND.

The electric motor 11 is a so-called three-phase AC motor, and includes a U-phase coil 11U, a V-phase coil 11V, and a W-phase coil 11W. The coil 11U, the coil 11V, and the coil 11W are, for example, Y-connected. When the coils 11U, 11V, and 11W receive power, the electric motor 11 rotates a rotor (not shown), a rotary shaft (not shown) connected to the rotor, etc.

The inverter circuit 12 constitutes a so-called three-phase inverter. The inverter circuit 12 includes switching elements TU1 and TU2 connected in series between the positive electrode line PL and the negative electrode line NL, switching elements TV1 and TV2 connected in series between the positive electrode line PL and the negative electrode line NL, and switching elements TW1 and TW2 connected in series between the positive electrode line PL and the negative electrode line NL. Hereinafter, any or all of the switching elements TU1, TU2, TV1, TV2, TW1, and TW2 will simply be referred to as a "switching element."

Each switching element is composed for example of a semiconductor transistor such as an insulated gate bipolar transistor (IGBT) or a field effect transistor (FET). FIG. 1 shows an example in which each switching element is composed of an IGBT.

The switching element TU1 constitutes an upper arm of the U-phase. The switching element TU2 constitutes a lower arm of the U-phase. The switching element TV1 constitutes an upper arm of the V-phase. The switching element TV2 constitutes a lower arm of the V-phase. The switching element TW1 constitutes an upper arm of the W phase. The switching element TW2 constitutes a lower arm of the W phase.

Specifically, the switching element TU1 has a collector connected to the positive electrode line PL, and an emitter connected to a collector of the switching element TU2. The switching element TU2 has an emitter connected to the negative electrode line NL. The switching element TV1 has a collector connected to the positive electrode line PL, and an emitter connected to a collector of the switching element TV2. The switching element TV2 has an emitter connected to the negative electrode line NL. The switching element TW1 has a collector connected to the positive electrode line PL, and an emitter connected to a collector of the switching element TW2. The switching element TW2 has an emitter connected to the negative electrode line NL.

A node N1 between the emitter of the switching element TU1 and the collector of the switching element TU2 is connected to the coil 11U. A node N2 between the emitter of the switching element TV1 and the collector of the switching element TV2 is connected to the coil 11V. A node N3 between the emitter of the switching element TW1 and the collector of the switching element TW2 is connected to the coil 11W.

Further, the inverter circuit 12 includes a diode DU1 connected to the switching element TU1 in parallel, a diode DU2 connected to the switching element TU2 in parallel, a diode DV1 connected to the switching element TV1 in parallel, a diode DV2 connected to the switching element TV2 in parallel, a diode DW1 connected to the switching element TW1 in parallel, and a diode DW2 connected to the switching element TW2 in parallel.

The diode DU1 has an anode connected to the emitter of the switching element TU1, and a cathode connected to the collector of the switching element TU1. The diode DU2 has an anode connected to the emitter of the switching element TU2, and a cathode connected to the collector of the switching element TU2. The diode DV1 has an anode connected to the emitter of the switching element TV1, and a cathode connected to the collector of the switching element TV1. The diode DV2 has an anode connected to the emitter of the switching element TV2, and a cathode connected to the collector of the switching element TV2. The diode DW1 has an anode connected to the emitter of the switching element TW1, and a cathode connected to the collector of the switching element TW1. The diode DW2 has an anode connected to the emitter of the switching element TW2, and a cathode connected to the collector of the switching element TW2.

The filter circuit 13 is disposed on an input side of the electric compressor 1 and constitutes an LC filter. When the inverter circuit 12 receives power from the battery 40, the filter circuit 13 suppresses a high-frequency component (or noise) of the power passing through the inverter circuit 12. The filter circuit 13 includes an inductor L13 provided on the positive electrode line PL and a capacitor C13 connected between the positive electrode line PL and the negative electrode line NL.

The drive circuit 14 is connected to a gate of each switching element of the inverter circuit 12 and the nodes N1, N2, and N3, and is also communicably connected to the control circuit 15. The drive circuit 14 includes a drive unit 50 that drives each switching element. The drive unit 50 controls each switching element to be in an ON state or an OFF state in response to a PWM signal received from the control circuit 15. Thus, the DC power supplied from the battery 40 is converted into AC power by the inverter circuit 12 and supplied to the electric motor 11. The drive circuit 14 is connected to a power supply path from the inverter circuit 12 to the electric motor 11 at the nodes N1, N2, and N3. It can also be said that the electric motor 11 and the drive circuit 14 are connected to the inverter circuit 12 so as to branch from the nodes N1, N2, and N3.

The control circuit 15 includes a processor such as a central processing unit (CPU), a field-programmable gate array (FPGA), and a graphics processing unit (GPU), and a memory such as random access memory (RAM) or read-only memory (ROM), and the control circuit 15 is configured such that the processor controls the drive circuit 14 based on data stored in the memory. Specifically, the control circuit 15 controls the drive circuit 14 by the PWM signal to control each switching element of the inverter circuit 12 to be in the ON state or the OFF state. Thus, the control circuit 15 converts the DC power that is supplied from the battery 40 into AC power by the inverter circuit 12 and supplies the AC power to the electric motor 11 to drive the electric motor 11.

The power supply circuit 16 is an internal power supply of the electric compressor 1. The power supply circuit 16 receives power supplied from a 12V low-voltage battery 90 included in the vehicular system 3 and supplies the received power to the control circuit 15 and the drive circuit 14 via different paths. For example, the power supply circuit 16 receives power from the low-voltage battery 90, converts the received power into power of 5 V or 10 V by a regulator (not shown) and supplies the converted power to the control circuit 15 through a power path 26. Furthermore, the power supply circuit 16 receives power from the low-voltage battery 90, converts the received power into power of 15 V by a regulator (not shown) and supplies the converted power to the drive circuit 14 through a power path 25. The power path 25 corresponds to a "second power supply path" in the present disclosure. Thus, the power supply circuit 16 supplies power lower than that supplied from the battery 40 to the inverter circuit 12 to the control circuit 15 and the drive circuit 14 via different paths. In FIG. 1, the voltage of the power supplied from the low-voltage battery 90 is denoted by "LV." As well as the battery 40, the low-voltage battery 90 corresponds to an "external battery" in the present disclosure. The battery 40 and the low-voltage battery 90 may be integrated into a single battery, and power may be supplied from this battery to the power supply circuit 16 after the power is decreased in voltage through a converter.

The control circuit 15 need not be supplied with power from the same power supply circuit (the power supply circuit 16 in this example) as the drive circuit 14, and may be supplied with power for example from a power supply circuit different from the power supply circuit 16 for the drive circuit 14.

[Configuration of Vehicular System]

Figure 2:
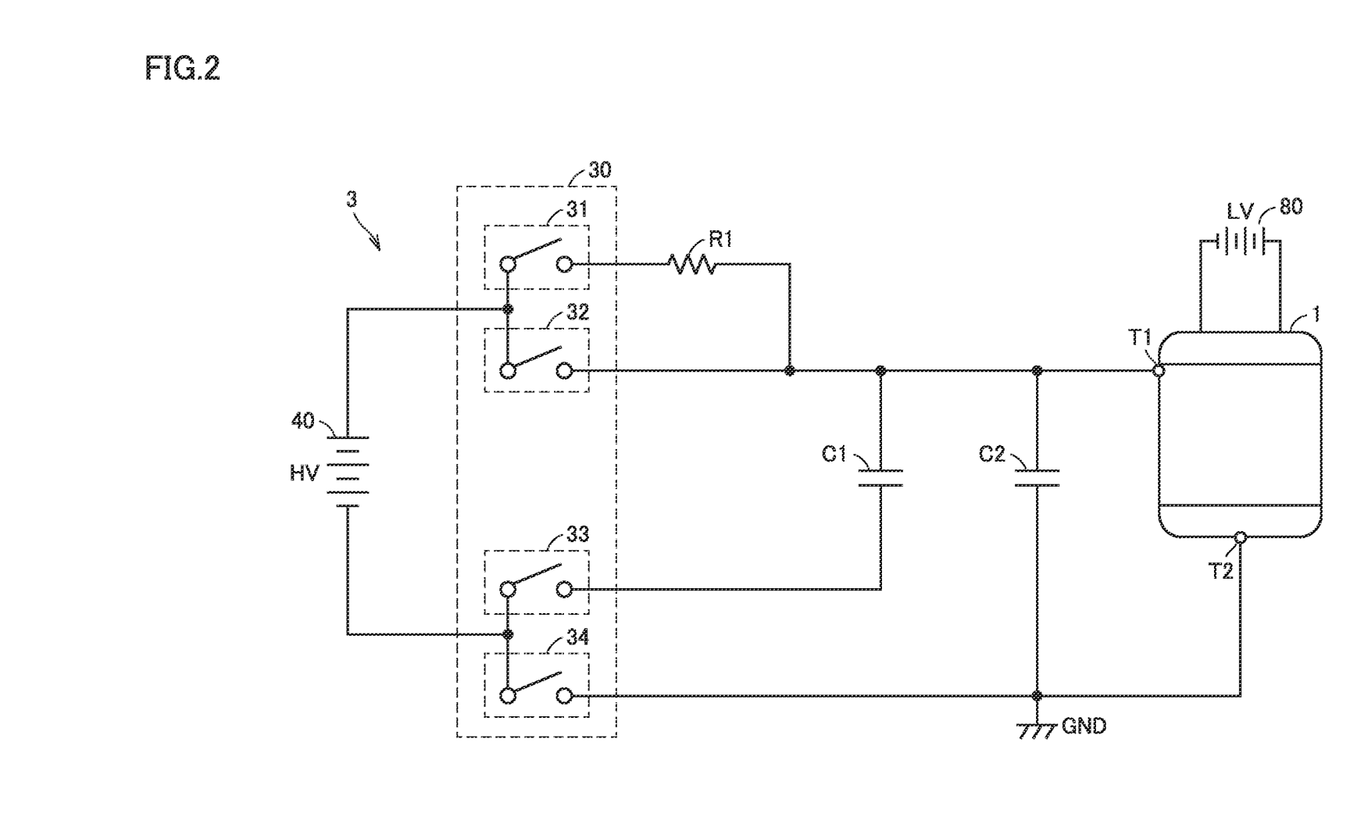
FIG. 2 is a circuit diagram showing a configuration of a vehicular system according to an embodiment.
Figure 3:
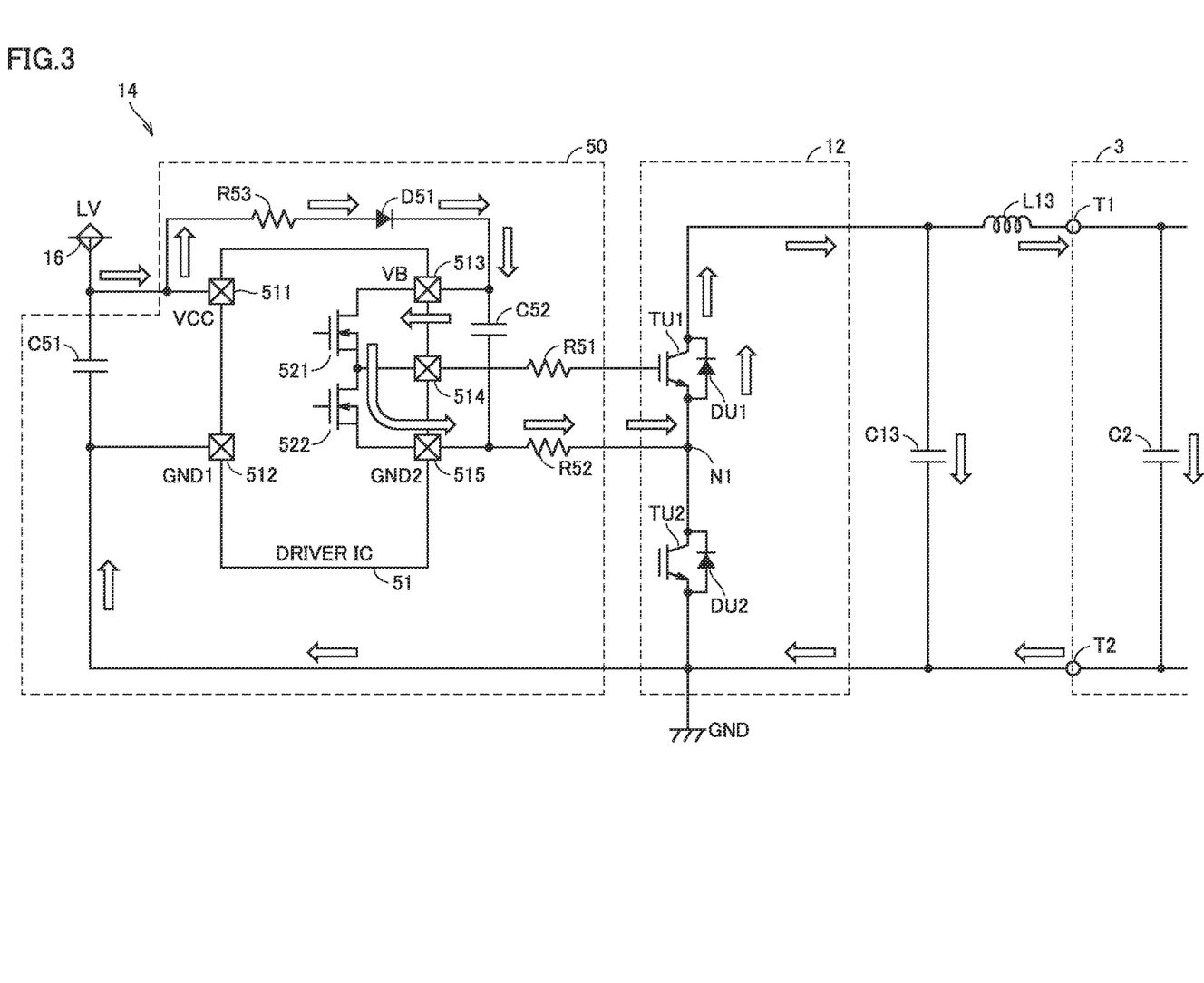
FIG. 3 is a circuit diagram showing a configuration of a drive unit of a drive circuit according to an embodiment.

A configuration of the vehicular system 3 according to an embodiment will be described with reference to FIG. 2. FIG. 2 is a circuit diagram showing a configuration of the vehicular system 3 according to the embodiment. FIG. 3 shows a configuration of a part of the vehicular system 3 to which the electric compressor 1 is connectable.

As shown in FIG. 2, the vehicular system 3 comprises the battery 40, the switch 30, a register R1, a capacitor C1, and a capacitor C2.

The switch 30 includes a switch 31 and a switch 32 provided between the positive terminal of the battery 40 and the electric compressor 1, and a switch 33 and a switch 34 provided between the negative terminal of the battery 40 and the electric compressor 1. Each of the switches 31 to 34 is constituted by a switch such as an electromagnetic contactor or an electromagnetic switch, and electrically connects or disconnects a path between the battery 40 and the electric compressor 1.

The switch 31 has one end connected to the positive terminal of the battery 40, and the other end connected to the connection point T1 of the electric compressor 1 via the register R1. The switch 32 has one end connected to the positive terminal of the battery 40, and the other end connected to the connection point T1 of the electric compressor 1.

The switch 33 has one end connected to the negative terminal of the battery 40, and the other end connected to the connection point T1 of the electric compressor 1 via the capacitor C1. The switch 34 has one end connected to the negative terminal of the battery 40, and the other end connected to the connection point T2 of the electric compressor 1.

The register R1 is connected to the switch 31 and the connection point T1 of the electric compressor 1 and functions as a precharge resistor.

The capacitor C1 is connected to the switch 33 and the connection point T1 of the electric compressor 1 and functions as a smoothing capacitor.

The capacitor C2 is connected to the connection points T1 and T2 in the electric compressor 1 and functions as a smoothing capacitor.

When the vehicular system 3 thus configured is started (e.g., when the vehicle has an ignition switch turned on), the switch 30 is controlled to be in the ON state to electrically connect the battery 40 and the electric compressor 1 to each other. Specifically, when the vehicular system 3 is started, the switch 33 is switched from the OFF state to the ON state, and the switch 34 is switched from the OFF state to the ON state. After the switch 31 is switched from the OFF state to the ON state, the switch 32 is switched from the OFF state to the ON state. Thereafter, the switch 31 is switched from the ON state to the OFF state. This electrically connects the battery 40 and the electric compressor 1 to each other, and starts supplying power from the battery 40 to the electric compressor 1.

In contrast, when the vehicular system 3 stops (e.g., when the vehicle has the ignition switch turned off), the switch 30 is controlled to be in the OFF state to electrically disconnect the battery 40 and the electric compressor 1 from each other. Specifically, when the vehicular system 3 stops, the switch 32 is switched from the ON state to the OFF state. Thereafter, the switch 33 is switched from the ON state to the OFF state, and the switch 34 is switched from the ON state to the OFF state. This electrically disconnects the battery 40 and the electric compressor 1 from each other, and stops supplying power from the battery 40 to the electric compressor 1.

[Configuration of Drive Circuit]

A configuration of the drive unit 50 of the drive circuit 14 according to an embodiment will be described with reference to FIG. 3. FIG. 3 is a circuit diagram showing a configuration of the drive unit 50 of the drive circuit 14 according to the embodiment. In FIG. 3, among the plurality of switching elements of the inverter circuit 12, only the switching elements TU1 and TU2 are shown, and the other switching elements are not shown. Further, while FIG. 3 shows the switching element TU1 alone having a gate with a power path connected thereto from the drive unit 50, in reality, the other switching elements also have their respective gates each with a power path connected thereto from the drive unit 50.

As shown in FIG. 3, the drive unit 50 includes a driver integrated circuit (IC) 51, a capacitor C51, a capacitor C52, a register R51, a register R52, a register R53, and a diode D51.

The driver IC 51 is an integrated circuit that operates in response to a PWM signal received from the control circuit 15 to control each switching element of the inverter circuit 12 to be in the ON state or the OFF state. The driver IC 51 includes terminals 511 to 515 and switching elements 521 and 522.

The terminal 511 is connected to the power supply circuit 16 and is also connected to the ground terminal GND via the capacitor C51. The terminal 512 is connected to the ground terminal GND. The terminal 513 is connected to the power supply circuit 16 via the register R53 and the diode D51, and is also connected to the terminal 515 via the capacitor C52. The diode D51 has anode connected to the register R53, and a cathode connected to the terminal 513 and the capacitor C52. The terminal 514 is connected to the gate of the switching element TU1 via the register R51. The terminal 515 is connected via the register R52 to the emitter of the switching element TU1 and the collector of the switching element TU2.

The switching elements 521 and 522 are each composed for example of a semiconductor transistor such as an IGBT or a FET. FIG. 3 shows an example in which the switching elements 521 and 522 are each composed of a FET. Inside the driver IC 51, the switching element 521 has a drain connected to the terminal 513, and a source connected to a drain of the switching element 522. The switching element 522 has a source connected to the terminal 515. The source of the switching element 521 and the drain of the switching element 522 are connected to the terminal 514.

The drive circuit 14 thus configured has the driver IC 51 driven using power supplied from the power supply circuit 16 to control each switching element of the inverter circuit 12 to be in the ON state or the OFF state in response to the PWM signal received from the control circuit 15.

[Phenomenon Caused When Vehicular System Stops]

As described above, when the vehicular system 3 stops (or when the ignition switch is turned off), the switch 30 is controlled to be in the OFF state to stop supplying power from the battery 40 to the electric compressor 1. Immediately after the power supplied from the battery 40 is stopped, the capacitors C2 and C13 on the high voltage side each have an electric charge stored therein, however, the residual electric charge stored in each of the capacitors C2 and C13 is gradually discharged as the drive device 80 is driven. This gradually decreases voltage on the high voltage side or the side of the vehicular system 3. In such a situation, when power supplied from the power supply circuit 16 to the drive circuit 14 is maintained and the voltage on the high voltage side becomes lower than the voltage of the power supplied from the power supply circuit 16 to the drive circuit 14, the power from the power supply circuit 16 may flow into the high voltage side via the inverter circuit 12.

Specifically, as indicated by an arrow in FIG. 3, a current by power supplied from the power supply circuit 16 flows via the register R53 and the diode D51 and is input to the terminal 513 of the driver IC 51, and flows via the switching elements 521 and 522 and is output from the terminal 515 of the driver IC 51. Specifically, when the system stops (or the ignition switch is turned off), the switching elements 521 and 522 have their respective gate voltages zeroed and are thus controlled to be in the ON state. Thus, the current by the power supplied from the power supply circuit 16 passes through the switching elements 521 and 522 and is output from the terminal 515 of the driver IC 51.

The current from the power supply circuit 16 that is output from the terminal 515 is input via the register R52 to the node N1 of the inverter circuit 12. In the inverter circuit 12, the switching element TU1 has its gate voltage zeroed and is thus controlled to be in the OFF state, and accordingly, the current from the power supply circuit 16 that is output from the terminal 515 passes through the diode DU1 and is output from the inverter circuit 12 to the vehicular system 3. The current from the power supply circuit 16 that is output from the inverter circuit 12 passes through the capacitor C13 while passing through the capacitor C2 of the vehicular system 3 via the inductor L13. Similarly, a current output from another terminal (not shown) of the driver IC 51 is input to the nodes N2 and N3, and finally passes through the capacitors C13 and C2.

As described above, a current from the power supply circuit 16 flows into the capacitors C2 and C13 on the high voltage side and thus builds up an electric charge (of an amount equivalent for example to about 10 V) in the capacitors C2 and C13. The electric charge remaining in the capacitors C2 and C13 may have an effect to damage devices in the vehicular system 3 or reduce their lifetimes.

Figure 4:
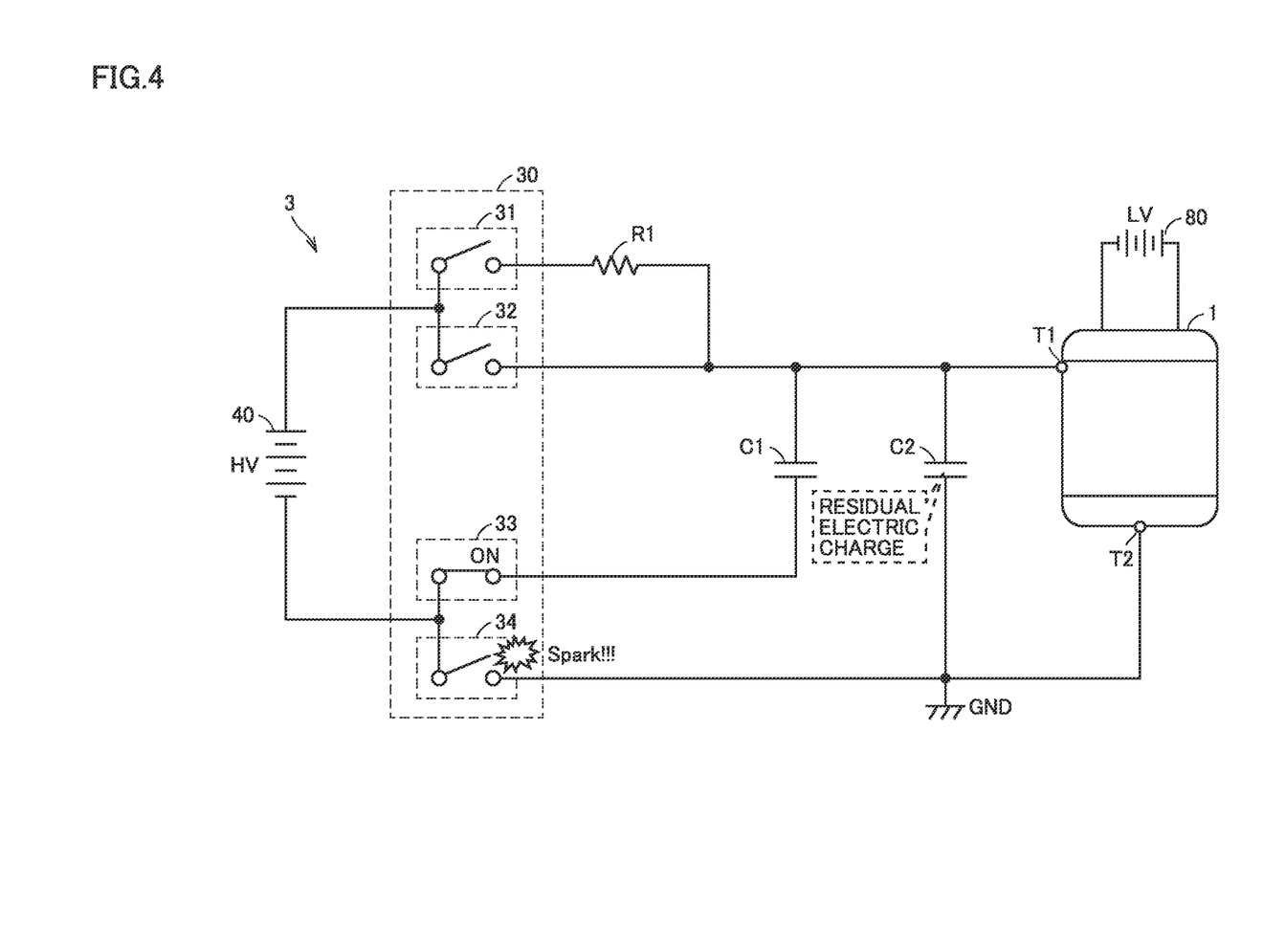
FIG. 4 is a diagram showing an example of an effect of a residual electric charge on the vehicular system.

For example, FIG. 4 shows an example of an effect of a residual electric charge on the vehicular system 3. As shown in FIG. 4, when the vehicular system 3 is started (or the ignition switch is turned on) while the capacitor C2 or the capacitor C13 (not shown) has a residual electric charge stored therein, the switch 33 is switched from the OFF state to the ON state, and the switch 34 is switched from the OFF state to the ON state. At the time, a closed circuit is formed by a path passing through the switch 33, the capacitor C1, the capacitor C2, and the switch 34, and the residual electric charge stored in the capacitor C2 is discharged at a one blast, which may cause a spark at the switch 34. As a result, there is a possibility that the switch 34 may have a contact point destructed and hence a reduced lifetime, or may have the contact point welded and hence a defect.

Accordingly, as shown in FIG. 1, the electric compressor 1 according to an embodiment comprises a switch 20 that connects or disconnects the power path 25 that passes power from the power supply circuit 16 to the drive circuit 14. Further, the electric compressor 1 comprises a current sensor 60 that measures a current passing through the inverter circuit 12, and a voltage sensor 70 that measures a voltage applied to the inverter circuit 12. It can also be said that the voltage sensor 70 measures a voltage between the capacitor C13 and the inverter circuit 12. The control circuit 15 controls the switch 20 based on a value of a voltage measured by the voltage sensor 70. Alternatively, the control circuit 15 may calculate power supplied from the battery 40 to the inverter circuit 12 based on a value of a current measured by the current sensor 60 and a value of a voltage measured by the voltage sensor 70, and control the switch 20 based on the calculated power. More specifically, the voltage sensor 70 measures a voltage between the capacitor C13 and the inverter circuit 12.

The switch 20 is configured by a switching circuit, such as a relay or a transistor, that connects or disconnects the power path 25. For the electric compressor 1, for example, a low drop out (LDO) regulator is used as the switch 20.

Further, as described above, while the power supply circuit 16 is configured to supply power to the control circuit 15 through the power path 26, the power supply circuit 16 is configured to supply power to the drive circuit 14 through the power path 25. Therefore, even if the power path 25 is disconnected by the switch 20, the power path 26 supplying power from the power supply circuit 16 to the control circuit 15 is not disconnected.

[Process for Controlling Switch by Control Circuit]

Figure 5:
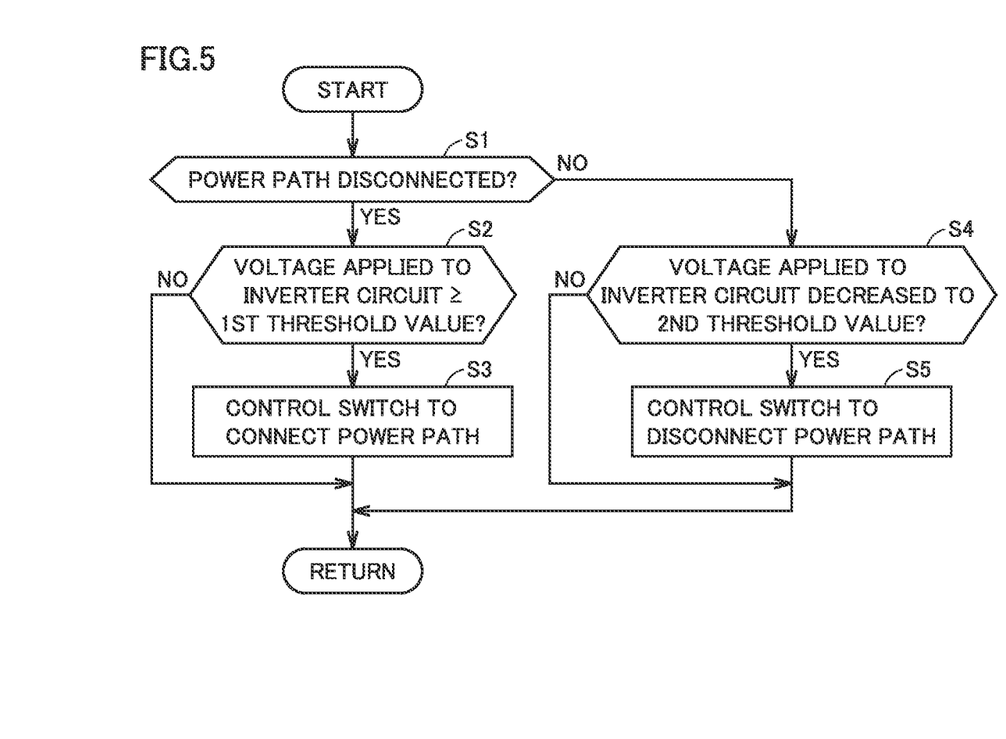
FIG. 5 is a flowchart of a process for controlling a switch by a control circuit according to an embodiment.

A process for controlling the switch 20 by the control circuit 15 according to an embodiment will now be described with reference to FIG. 5. FIG. 5 is a flowchart of a process for controlling the switch 20 by the control circuit 15 according to the embodiment. When a predetermined condition is established, the FIG. 5 flowchart is invoked from a main routine (not shown) and periodically executed. Each step of the control circuit 15 is implemented by a processor executing a program stored in a memory. Hereinafter, a step is abbreviated as S.

As shown in FIG. 5, the control circuit 15 determines whether the power path 25 is disconnected (S1). When the power path 25 is disconnected (YES in S1), the control circuit 15 determines whether a voltage applied from the battery 40 to the inverter circuit 12 is equal to or larger than a first threshold value (S2). The "first threshold value" may be any value equal to or larger than a voltage applied from the power supply circuit 16 to the drive circuit 14, more specifically, any value equal to or larger than a voltage between the power supply circuit 16 and the drive circuit 14, and may for example be a minimum operating voltage of the electric compressor 1.

When the voltage applied from the battery 40 to the inverter circuit 12 is equal to or larger than the first threshold value (YES in S2), the control circuit 15 controls the switch 30 to be in the ON state to connect the power path 25 (S3). On the other hand, when the voltage applied from the battery 40 to the inverter circuit 12 is neither equal to nor larger than the first threshold value (NO in S2), or after step S3 is performed, the control circuit 15 returns the process to the main routine.

As described above, when, with the power path 25 disconnected, the vehicular system 3 is started (or the ignition switch is turned on) and applying voltage to the inverter circuit 12 is started and voltage applied from the battery 40 to the inverter circuit 12 gradually increases, and once the voltage applied to the inverter circuit 12 attains a first threshold value or higher, the switch 30 connects the power path 25. Thus, the control circuit 15 can prevent a voltage applied from the power supply circuit 16 to the drive circuit 14 from being higher than a voltage on the high voltage side and thus flowing into the high voltage side, and can hence prevent power for controlling the electric compressor 1 from having an effect to damage devices in the vehicular system 3 or reduce their lifetimes.

When the power path 25 is not disconnected (NO in S1), the control circuit 15 determines whether the voltage applied from the battery 40 to the inverter circuit 12 has decreased to a second threshold value (S4). The "second threshold value" may be any value equal to or larger than a voltage applied from the power supply circuit 16 to the drive circuit 14, more specifically, any value equal to or larger than a voltage between the power supply circuit 16 and the drive circuit 14, and may for example be the minimum operating voltage of the electric compressor 1. The first threshold value may be equal to or different from the second threshold value.

When the voltage applied from the battery 40 to the inverter circuit 12 has decreased to the second threshold value (YES in S4), the control circuit 15 controls the switch 30 to be in the OFF state to disconnect the power path 25 (S5). On the other hand, when the voltage applied from the battery 40 to the inverter circuit 12 has not decreased to the second threshold value (NO in S4), or after step S5 is performed, the control circuit 15 returns the process to the main routine.

Thus, when, with the power path 25 connected, the vehicular system 3 is stopped (or the ignition switch is turned off) and accordingly, supplying power to the inverter circuit 12 is stopped and a voltage applied from the battery 40 to the inverter circuit 12 gradually decreases, and once the voltage applied to the inverter circuit 12 has decreased to a second threshold value, the switch 30 disconnects the power path 25. That is, the power path 25 is disconnected by the switch 30 before the voltage applied to the inverter circuit 12 is less than the second threshold value. Thus, the control circuit 15 can prevent a voltage applied from the power supply circuit 16 to the drive circuit 14 from being higher than a voltage on the high voltage side and thus prevent power supplied from the power supply circuit 16 to the drive circuit 14 from flowing into the high voltage side, and can hence prevent power for controlling the electric compressor 1 from having an effect to damage devices in the vehicular system 3 or reduce their lifetimes.

[Configuration of the Present Disclosure]

An electric compressor according to an aspect of the present disclosure comprises an electric motor, a filter circuit, a capacitor, an inverter circuit, a drive circuit, a power supply circuit, a switch, and a control circuit. The filter circuit reduces noise in power supplied from an external battery. The capacitor constitutes a filter circuit. The inverter circuit receives power supplied from the battery through the filter circuit, converts the received power from DC power to AC power, and supplies the AC power to the electric motor. The drive circuit is connected to a first power supply path from the inverter circuit to the electric motor to control an operation of the inverter circuit. The power supply circuit receives power supplied from the battery, transforms the received power, and supplies the transformed power to the drive circuit. The switch connects or disconnects a second power supply path that supplies power from the power supply circuit to the drive circuit. The control circuit controls an operation of the switch. The control circuit connects the second power supply path in response to a voltage between the capacitor and the inverter circuit being higher than a voltage between the power supply circuit and the drive circuit, and the control circuit disconnects the second power supply path in response to the voltage between the capacitor and the inverter circuit being lower than the voltage between the power supply circuit and the drive circuit.

According to the above configuration, the electric compressor can connect or disconnect by a switch a second power supply path that passes power from the power supply circuit to the drive circuit. The electric compressor can thus prevent power supplied from the power supply circuit to the drive circuit from building up an electric charge in a capacitor in the electric compressor, and can hence prevent power for controlling the electric compressor from having an effect to damage devices in a system having the electric compressor mounted therein or reduce their lifetimes.

Preferably, the control circuit controls the switch to connect the second power supply path in response to the voltage between the capacitor and the inverter circuit being equal to or larger than a first threshold value as supplying power from the battery to the inverter circuit is started while the second power supply path is disconnected.

According to the above configuration, when, with the second power supply path disconnected, supplying power from the battery to the inverter circuit is started, and once the voltage between the capacitor and the inverter circuit, or the voltage of the power supplied from the battery to the inverter circuit, attains the first threshold value or higher, the switch connects the power path, and the electric compressor can thus prevent power supplied from the power supply circuit to the drive circuit from being higher in voltage than a voltage on a high voltage side and hence building up an electric charge in a capacitor in the electric compressor.

Preferably, the control circuit controls the switch to disconnect the second power supply path in response to the voltage between the capacitor and the inverter circuit decreasing to a second threshold value while the second power supply path is connected.

According to the above configuration, when, with the second power supply path connected, the voltage between the capacitor and the inverter circuit, or the voltage of the power supplied from the battery to the inverter circuit, decreases to the second threshold value, the switch disconnects the second power supply path, and the electric compressor can thus prevent power supplied from the power supply circuit to the drive circuit from building up an electric charge in a capacitor in the electric compressor.

While the present disclosure has been described in embodiments, it should be understood that the embodiments disclosed herein are illustrative and non-restrictive in any respect. The scope of the present disclosure is defined by the terms of the claims, and is intended to include any modifications within the meaning and scope equivalent to the terms of the claims.

What is claimed is:

1. An electric compressor for connecting to a vehicular system via a positive electrode line and a negative electrode line, the vehicular system comprising: a first battery; a second battery having a lower voltage than the first battery; a first switch between a positive terminal of the first battery and a first connection point of the positive electrode line; a plurality of second switches between a negative terminal of the first battery and a second connection point of the negative electrode line; a first capacitor; and a second capacitor, wherein one end of one of the plurality of second switches is connected to the negative terminal of the first battery, an other end of the one second switch is connected to the first connection point via the first capacitor, one end of an other of the plurality of second switches is connected to the negative terminal of the first battery, and an other end of the other second switch is connected to the second connection point and the first connection point via the second capacitor, the electric compressor comprising:
an electric motor;
a filter circuit configured to reduce noise in power supplied from the first battery;
a third capacitor that is between the positive electrode line and the negative electrode line and constitutes the filter circuit;
an inverter circuit connected to the vehicular system via the positive electrode line and the negative electrode line, and configured to: receive the power supplied from the first battery through the filter circuit, convert the received power from direct-current power to alternating-current power, and supply the alternating-current power to the electric motor;
a drive circuit that is connected to a first power supply path from the inverter circuit to the electric motor and configured to control an operation of the inverter circuit;
a power supply circuit configured to receive power supplied from the second battery, and supply the received power to the drive circuit;
a third switch configured to connect or disconnect a second power supply path configured to supply power from the power supply circuit to the drive circuit; and
a control circuit configured to control an operation of the third switch, wherein
the power supply circuit is further configured to supply the received power to the control circuit through a third power supply path that is different from the second power supply path,
the control circuit, after the first switch and the plurality of second switches are turned off and supplying the power from the first battery to the inverter circuit is stopped, is configured to connect the second power supply path in response to a voltage between the third capacitor and the inverter circuit being higher than a voltage between the power supply circuit and the drive circuit, and disconnect the second power supply path in response to the voltage between the third capacitor and the inverter circuit being lower than the voltage between the power supply circuit and the drive circuit.

2. The electric compressor according to claim 1, wherein the control circuit is further configured to control the third switch to connect the second power supply path in response to the voltage between the third capacitor and the inverter circuit being equal to or larger than a first threshold value as supplying the power from the first battery to the inverter circuit is started while the second power supply path is disconnected.

3. The electric compressor according to claim 1, wherein the control circuit is further configured to control the third switch to disconnect the second power supply path in response to the voltage between the third capacitor and the inverter circuit decreasing to a second threshold value while the second power supply path is connected.

* * * * *